US010417005B2

(12) United States Patent
Weiser et al.

(10) Patent No.: US 10,417,005 B2
(45) Date of Patent: Sep. 17, 2019

(54) MULTI-MULTIDIMENSIONAL COMPUTER ARCHITECTURE FOR BIG DATA APPLICATIONS

(71) Applicant: HUAWEI TECHNOLOGIES CO., LTD., Shenzhen, Guangdong (CN)

(72) Inventors: Uri Weiser, Munich (DE); Tal Horowitz, Munich (DE); Jintang Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/700,488

(22) Filed: Sep. 11, 2017

(65) Prior Publication Data

US 2017/0371676 A1    Dec. 28, 2017

Related U.S. Application Data (63) Continuation of application No. PCT/EP2015/055493, filed on Mar. 17, 2015.

(51) Int. Cl.
*G06F 15/76*     (2006.01)
*G06F 9/50*      (2006.01)
(Continued)

(52) U.S. Cl.
CPC .......... *G06F 9/3895* (2013.01); *G06F 9/5027* (2013.01); *G06F 15/80* (2013.01);
(Continued)

(58) Field of Classification Search
CPC ...... G06F 9/3895; G06F 9/5027; G06F 9/505; G06F 9/5055; G06F 9/5083;
(Continued)

(56) References Cited

U.S. PATENT DOCUMENTS 5,742,814 A    4/1998  Balasa et al.
6,681,295 B1*  1/2004  Root ................... G06F 9/30047
                                                        711/128
(Continued)

FOREIGN PATENT DOCUMENTS

CN    103885919 A    6/2014
CN    104090848 A    10/2014
(Continued)

OTHER PUBLICATIONS

PCT/EP2015/055493, International Preliminary Report on Patentability Chapter 1 dated Sep. 19, 2017 (Year: 2017).*
(Continued)

*Primary Examiner* — Daniel H Pan
(74) *Attorney, Agent, or Firm* — Leydig, Voit & Mayer, Ltd.

(57) ABSTRACT

A data processing apparatus is provided comprising a front-end interface electronically coupled to a main processor. The front-end interface is configured to receive data stored in a repository, in particular an external storage and/or a network, determine whether the data is a single-access data or a multiple-access data by analyzing an access parameter designating the data, route the multiple-access data for processing by the main processor, and route the single-access data for pre-processing by the front-end interface and routing results of the pre-processing to the main processor.

15 Claims, 8 Drawing Sheets

(51) Int. Cl.
*G06F 9/312* (2018.01)
*G06F 9/38* (2018.01)
*G06F 15/80* (2006.01)
*G06F 15/17* (2006.01)

(52) U.S. Cl.
CPC ............ *G06F 9/3877* (2013.01); *G06F 9/505* (2013.01); *G06F 9/5055* (2013.01); *G06F 9/5083* (2013.01); *G06F 15/17* (2013.01); *Y02D 10/22* (2018.01); *Y02D 10/28* (2018.01)

(58) Field of Classification Search
CPC ...... G06F 9/4881; G06F 9/4887; G06F 15/80; G06F 17/30864; G06F 17/30867; G06F 17/30616; G06F 17/300011
USPC .................. 712/10, 17, 30, 225, 29, 31, 34; 707/727, 730, 750
See application file for complete search history.

(56) References Cited

U.S. PATENT DOCUMENTS

| | | | |
|---|---|---|---|
| 7,174,393 B2 | 2/2007 | Boucher et al. | |
| 7,701,251 B1 | 4/2010 | Rahman et al. | |
| 8,224,800 B2 | 7/2012 | Branscome et al. | |
| 8,244,718 B2 | 8/2012 | Chamdani et al. | |
| 2002/0135794 A1* | 9/2002 | Rodriguez | G06F 17/30902 358/1.15 |
| 2006/0259733 A1 | 11/2006 | Yamazaki et al. | |
| 2008/0140980 A1 | 6/2008 | Mei et al. | |
| 2009/0158067 A1 | 6/2009 | Bodas et al. | |
| 2009/0198699 A1* | 8/2009 | Acedo | G06F 17/30312 |
| 2011/0231640 A1 | 9/2011 | Avadhanam | |
| 2011/0258709 A1 | 10/2011 | Munzenberger et al. | |
| 2013/0086036 A1* | 4/2013 | Rizzo | G06F 17/30864 707/709 |
| 2013/0290343 A1 | 10/2013 | Kruglick | |
| 2014/0012800 A1 | 1/2014 | Oh et al. | |
| 2015/0006834 A1 | 1/2015 | Dulloor et al. | |

FOREIGN PATENT DOCUMENTS

| | | | | |
|---|---|---|---|---|
| CN | 104391656 A | | 3/2015 | |
| CN | 104794150 A | | 7/2015 | |
| CN | 107408060 A | * | 11/2017 | ........... G06F 9/5027 |
| KR | 20080086918 A | | 9/2008 | |
| KR | 20110099120 A | | 9/2011 | |
| KR | 20120091361 A | | 8/2012 | |
| KR | 20140005474 A | | 1/2014 | |
| WO | 0010084 A2 | | 2/2000 | |
| WO | 2007079303 A2 | | 7/2007 | |
| WO | WO2014/070166 | * | 5/2014 | |
| WO | WO2016146166 | * | 9/2016 | |

OTHER PUBLICATIONS

Intel Data Direct I/O Technology (Intel DDIO): A Primer,Technical Brief, Revision 1.0. Disponível em:https://www.intel.com/content/dam/www/public/us/en/documents/technology-briefs/data-direct-i-o-technology-brief.pdf, Feb. 2012, 11 pages.
Lisa Wu et al, Navigating Big Data with High-Throughput, Energy-Efficient Data Partitioning. ISCA '13 Tel Aviv, Israel, 2013, 12 pages.
Adrian M. Caulfield et al, Gordon: Using Flash Memory to Build Fast, Power-efficient Clusters for Data-intensive Applications. Appears in the 14th International Conference on Architectural Support for Programming Languages and Operating Systems (ASPLOS'09), ASPLOS'09, Mar. 7-11, 2009, Washington, DC, USA. 12 pages.
Alexander S. Szalay et al, Low-Power Amdahl-Balanced Blades for Data Intensive Computing. Oper. Syst. Rev. 44,, 2010, 5 pages.
Krishna T. Malladi et al, Towards Energy-Proportional Datacenter Memory with Mobile DRAM. The 39th Annual International Symposium on Computer Architecture, Portland—EUA, 2012 IEEE, 12 pages.
Han Hu et al., "Toward Scalable Systems for Big Data Analytics: A Technology Tutorial," IEEE Access, vol. 2, Jun. 24, 2014, XP011553982, pp. 652-687.
Mike Ferguson, "Architecting a big data platform for analytics," Intelligent Business Strategies, IBM Corp., Oct. 2012, XP055204782, total 36 pages.

\* cited by examiner

MULTI-MULTIDIMENSIONAL COMPUTER ARCHITECTURE FOR BIG DATA APPLICATIONS

CROSS-REFERENCE TO RELATED APPLICATIONS

This application is a continuation of International Application No. PCT/EP2015/055493, filed on Mar. 17, 2015, the disclosure of which is hereby incorporated by reference in its entirety.

TECHNICAL FIELD

The present disclosure, in some embodiments thereof, relates to a computerized apparatus and, more specifically, but not exclusively, to a computerized apparatus for executing data processing applications.

BACKGROUND

In modern computer systems, data processing applications are executed on computer systems comprising standard computer architectures. As data processing applications are continually analyzing larger and large datasets, such as big data applications, computer systems are being improved to meet the needs of the applications and large datasets. As used herein, the term big data means any collection of data that is too large to process using traditional data processing methods and computers. For example, more than a terabyte of data may be analyzed by a data processing application to determine marketing trends. Typical computer systems executing big data applications may incorporate 64 gigabytes of random access memory.

Figure 1A:
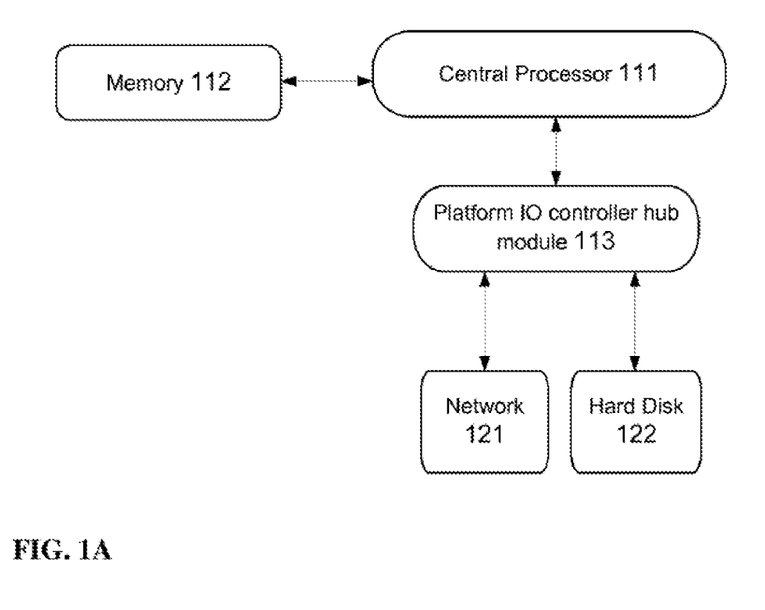
FIG. 1A is a schematic illustration of standard computer components and interconnections.

Following is a description of traditional computers and data flow in big data applications. Reference is now made to FIG. 1A, which is a schematic illustration of current computer components and interconnections. The main central processor and/or processing unit 111 (CPU) executes a data processing application using computer memory 112, using a direct memory access (DMA) interface, a front side bus, and the like. As used herein, the term processing unit and/or processor means a processor of a computer, computerized device, computerized apparatus, and the like. As used herein, the term central processor means the main electronic integrated circuit that executes the instructions of a computer program, such as the main processor, a central processing unit, multi-core central processor, and the like. The CPU 111 is connected to a platform input and/or output (I/O) controller hub 113, such as using a direct media interface. For example, the CPU is an Intel® Itanium® processor, an Intel® Xeon® processor, an Advanced Micro Devices Opteron™ processor, an IBM® zEC12 processor, and the like. The platform I/O controller hub 113 is connected to computer peripherals such as a hard disk, a network interface, a keyboard, a mouse, and the like.

Big data applications transfer large quantities of data from the hard disk and/or network interface to be stored in the computer main memory and from main memory to the CPU for pre-processing and analysis.

Figure 1B:
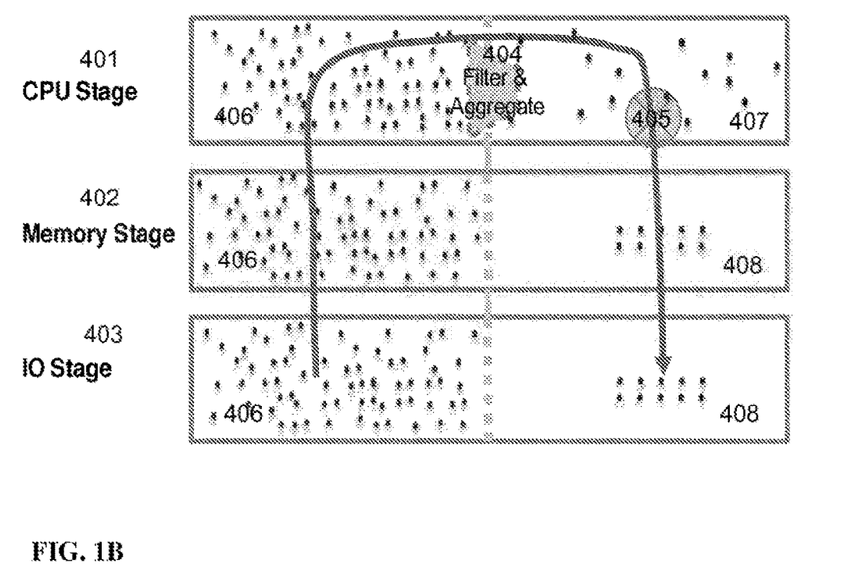
FIG. 1B is a schematic illustration of standard data flow stages in a data processing application showing the data reduction steps.
Figure 1C:
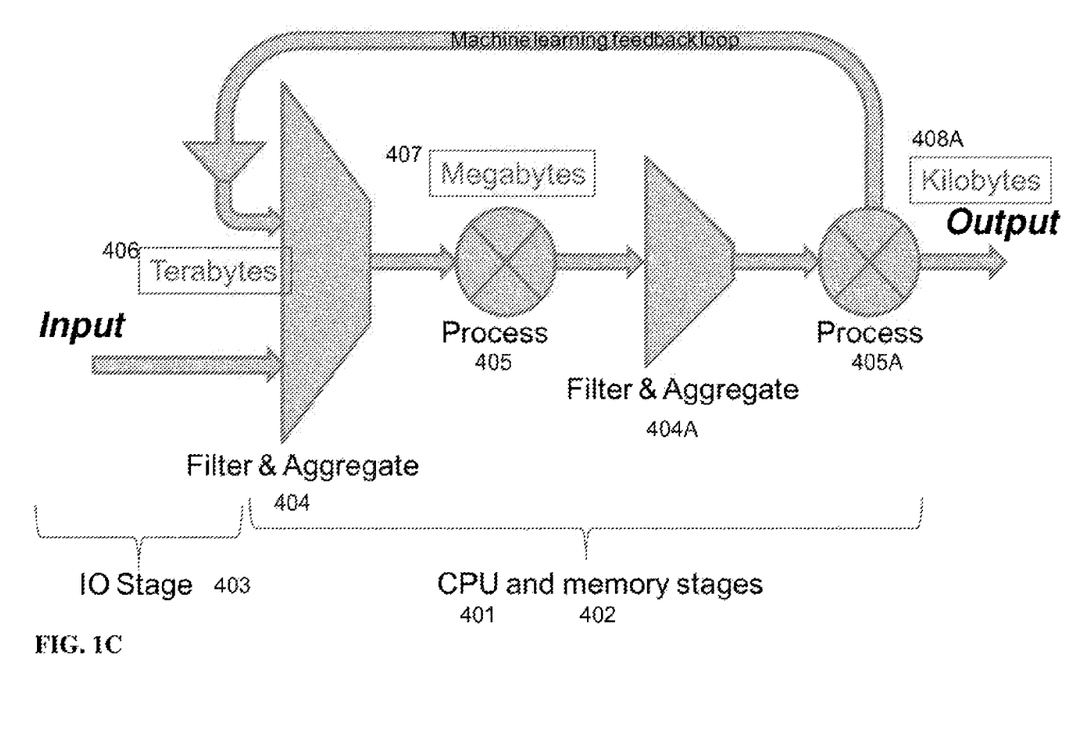
FIG. 1C is a schematic illustration of a standard process graph in data processing application execution showing the data reduction steps.

Reference is now made to FIG. 1B and FIG. 1C, which are schematic illustration of a standard data flow stage and a standard process graph in a data processing application, showing the data reduction steps. The data flow architecture comprises three stages: an I/O stage 403 where the big data 406 are received by from repositories, such as terabytes of data, a memory stage 402 where the big data 406 are stored in main memory, and a CPU stage 401 for pre-processing and analysis. The CPU stage 401 applies a filter and aggregate process 404 to the big data 406 to extract a smaller dataset 407, such as a dataset of megabytes in size. The smaller dataset 407 is analyzed 405 to produce a structured dataset and/or results 408 stored in the memory during the memory stage 402. The structured dataset and results 408 may be sent during the I/O stage to a user and/or a computer device for further processing. The results 408 may again be pre-processed 404A and analyzed 405A, resulting in a smaller dataset 408A, such as a dataset size reduced to kilobytes of data. The CPU of standard computer architectures performs both the pre-processing and processing using the computer main memory.

SUMMARY

A data processing apparatus is provided according to some embodiments, comprising a front-end interface electronically coupled to a main processor. The front-end interface is configured to receive data stored in a repository, in particular an external storage and/or a network, determine whether the data is a single-access data or a multiple-access data by analyzing an access parameter designating the data, route the multiple-access data for processing by the main processor, and route the single-access data for pre-processing by the front-end interface and routing results of the pre-processing to the main processor.

A method is provided according to some embodiments, comprising receiving data stored in a repository, in particular an external storage and/or a network, determining whether the data is a single-access data or a multiple-access data by analyzing an access parameter designating the data, routing the multiple-access data for processing by a main processor, and routing the single-access data for pre-processing by a front-end interface and routing results of the pre-processing to the main processor.

A non-transitory computer readable media is provided, storing computer instructions, that when executed by one or more processors, cause the one or more processors to perform the steps of receive data stored in a repository, in particular an external storage and/or a network, determine whether the data is a single-access data or a multiple-access data by analyzing an access parameter designating the data, route the multiple-access data for processing by a main processor, and route the single-access data for pre-processing by a front-end interface and routing results of the pre-processing to the main processor.

BRIEF DESCRIPTION OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

The present disclosure, in some embodiments thereof, relates to a computerized apparatus and, more specifically, but not exclusively, to a computerized apparatus for executing data processing applications. An object of embodiments of the disclosure is to efficiently execute big data processing applications.

Standard computers, such as servers and workstations, are used to execute data processing applications with terabytes of input data and typically only have several tens of gigabytes of memory. The computers execute data processing applications to pre-process the terabytes of input data by moving input data in batches to the computer memory, such as using virtual memory, memory page swapping, and the like. A processor retrieves the input data batches from memory and performs the pre-processing, such as filtering and aggregating, according to the data processing application instructions. When all the input data is pre-processed, the processor performs the analysis. As the main processor may be a high power processor, and some of the data is used infrequently or only once, such as single access data, there is significant power consumption overhead due to transferring large amounts of data to the main processor for pre-processing. Therefore, data processing application performance in current computers is limited by both processing speed and data transfer rates to and from memory. The speed and transfer rates effect the energy consumption of the computing device executing the data processing application. With the advancement in main central processor and/or processing unit (CPU) architecture and silicon technology, data movement to the CPU for pre-processing and analysis is becoming the dominant factor affecting the energy consumption and performance of big data applications. As used herein, the term big data application may mean a data processing application than uses as input more than a hundred gigabytes of data.

Current solutions focus on minimizing the CPU energy consumption per instruction without changing the data flow architecture between the computer components. For example, the design of new memory interfaces, such as double data rate fourth generation synchronous dynamic random-access memory (DDR4), reduces the energy consumption per data movement, but the increasingly larger amounts of data being transferred to the CPU result in increasingly higher energy consumption rates.

The energy consumption involved when moving data across integrated circuits, such as memory and CPU chips, does not scale up at the same rate as the energy required for computational tasks. Data processing applications that have an ever increasing input data size result in current solutions not being capable of scaling up relative to the size of input data required by the big data applications. The power consumption overhead of transferring the data to the CPU for the initial pre-processing of the input data to reduce the terabytes to gigabytes is becoming the limiting factor in data processing application performance. This can result in a bottleneck during processing, wherein the thermal design power of the computing device and/or CPU becomes the limiting factor of processing speed for big data applications. The energy consumption is also a significant expense in the operation of the data processing application computing apparatuses.

According to some embodiments of the disclosure, a front end interface comprising one or more local processors determines (for each data element used as input to a data processing application) whether the data element is a single-access data element or multiple-access data element, and according to the access order of the input data. The multiple access data, which may be accessed more frequently than single access data, is routed to the CPU by the front end interface for storage in a main computer memory. The single access data is routed by the front end interface for pre-processing by the one or more local processors. Pre-processing part of the input data at the front end interface avoids the power consumption overhead of transferring the single access data to the CPU, overcomes the processing bottleneck of big data applications, and reduces energy consumption of a computer executing a big data application.

The front end interface computes an access parameter value for each data element of the input data by locating repeat accesses to that same data element and computing a value based the other data element accesses occurring between the two repeats. The access parameter may be computed by counting the total number of accesses between repeated accesses to the same data element, counting the total number of different accesses to the same data element, time between accesses to the same data element, or the like. The data access may be a sequence of requests for data elements, a sequence of data elements received for pre-processing, a stream of data access requests, a stream of data, or the like. The one or more local processor pre-processes the single access data that is used only once and/or needed infrequently, thus reducing energy consumption overhead compared to sending the single access data to the CPU and main memory.

In an example, a computer with 100 megabytes of memory executes a data processing application with a terabyte of input data. The front end interface determines from the application's input data access that the first data element is accessed a second time 200 megabytes downstream in an access sequence. When the first data element is pre-processed by a computer without the front end interface, the first data element would be stored in memory for the first access, swapped out to a paging file after the 100 megabyte main memory is full, such as using a virtual memory technique, and swapped back into main memory for the second access. By determining that the first data element is a single access element, and routing the first data element to the front end interface for pre-processing, the power consumption can be reduced. For example, each transfer of a data element requires one pico-joule of energy for main computer memory and half a pico-joule for front end interface. Pre-processing the first data element by the CPU consumes three pico-joules of energy for three transfers, and by the front end interface consumes one pico-joule of energy for the two transfers. In this example, power consumption is reduced by computing the access parameter value as the amount of input data between two accesses to the same data element, and determining single access data by comparing the parameter value of each element to a value based on the available computer main memory.

According to some embodiments of the present disclosure there is provided a method and apparatus for incorporating a front end interface comprising one or more local processors, to reduce the power consumption during execution of data processing applications by a data processing apparatus. As used herein, the term front end interface means an input and/or output stage data pre-processing device incorporated into a data processing apparatus that may include small processor cores, memory, and one or more input/output interfaces. The front end interface determines for each data element accessed whether the data element is a single access data element or a multiple access data element according to a parameter value computed from the access sequence. The front end interface pre-processes large amounts of single access data, such as terabytes of data, prior to analysis by a CPU, thus reducing the amount of data transferred to the CPU and the energy consumption of the CPU and/or computer.

The single access data is routed to and pre-processed by one or more local processors of the front end interface. The results may be stored in a local memory unit, such as a memory cache. The front end interface routes the pre-processing results to the CPU for storage in main memory and data analysis is continued by the main CPU. When the input data and/or analysis results are needed for further pre-processing by the front end interface, they may be stored on a memory unit that is attached to the front end interface and accessible by the CPU.

Single access data may be present in any type of application. For example, in big data applications, a large percentage of the input data is single access data.

The front end interface performs the pre-processing stage of a big data application, such as filtering and aggregation of the input data, without transferring a large amount of data to the CPU and/or the main memory. The results of the pre-processing performed by the front end interface are significantly smaller than the input data, and are transferred into the main memory for analysis by the CPU.

Optionally, the front end interface may include one or more memory controllers that receive requests for input data from the CPU and/or receives the corresponding input data from a hard disk or network interface. The memory controllers may calculate the access parameter value of each input data element based on the requested sequence and/or the received sequence, and may route the data according to access type, such as single access data and multiple access data. A memory controller may coordinate the mapping of memory address with the CPU main memory.

Optionally, the access parameter is an absolute time between accesses of the same data element. For example, when a data element has been accessed only once in 5 seconds, the data element is determined to be a single access data element.

Optionally, the access parameter is a relative time between accesses of the same data element. For example, relative time is determined by placing events in a chronological order, such as a time sequence, and counting occurrences of events in the time sequence. For example, when a data element has been accessed only once in 10 million data elements, the data element is determined to be a single access data element.

Optionally, the access parameter is a count of different data elements between accesses of the same data element. For example, when between two accesses of the same data element of 3 million different data elements, such as a reuse distance, the data element is determined to be a single access data element.

Optionally, the access parameter is a measure of the total size of different data elements between accesses of the same data element. For example, when between two accesses of the same data element 10 gigabytes of different data elements are accessed, the data element is determined to be a single access data element.

Optionally, the access parameter value is compared to a fixed threshold value to determine that the data element is a single access data element.

Optionally, the access parameter value is compared to a dynamic threshold value and the dynamic threshold value is computed based on resource availability of the data processing apparatus. For example, the dynamic threshold value is computed based on comparing a thermal design power to the instantaneous power consumption of the data processing apparatus. For example, the dynamic threshold value is computed based on the instantaneous available memory of the data processing apparatus.

Optionally, the routing threshold value to be compared with the access parameter value is dynamically adjusted to minimize a power consumption of a data processing apparatus. For example, an instantaneous power consumption value is received from the power supply of the computer, and the routing threshold is adjusted dynamically to lower the instantaneous power consumption value.

Optionally, the input data is selected for pre-processing at the front end interface based on optimizing a cost function of the energy consumption needed for processing the input data. For example, the cost function determines that a reuse distance of 2.37 billion data elements is the optimal reuse distance to use in selecting data for processing the input data using the front end interface. In this example, data elements with a reuse distance greater than a 2.37 billion threshold are considered single access data elements and pre-processed by the front end interface.

The benefits of using the front end interface for pre-processing include a significant reduction in the energy consumption of the computing device and/or CPU. For example, the front end interface pre-processes the single access data and reduces more than 50% of the energy consumption in comparison to performing all pre-processing of this data by the CPU.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, an apparatus, a device, a process and/or a method.

Aspects of the present disclosure are described herein with reference to flowchart illustrations and/or block diagrams of methods, apparatus, and systems according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and devices according to various embodiments of the present disclosure. In this regard, each block in the flowchart or block diagrams may represent a module, segment, or portion of instructions, which comprises one or more actions for implementing the specified logical function(s). In some alternative implementations, the functions noted in the block may occur out of the order noted in the figures. For example, two blocks shown in succession may, in fact, be executed substantially concurrently, or the blocks may be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2A:
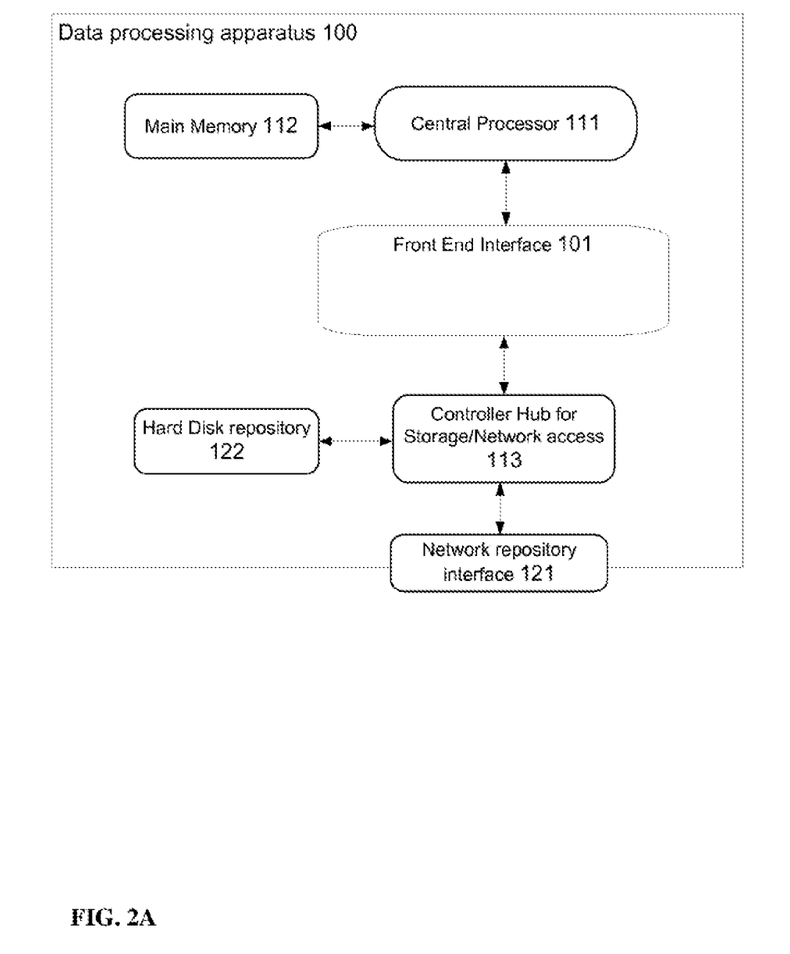
FIG. 2A is a schematic illustration of a data processing apparatus showing a front end interface to perform data pre-processing, according to some embodiments of the disclosure.
Figure 2B:
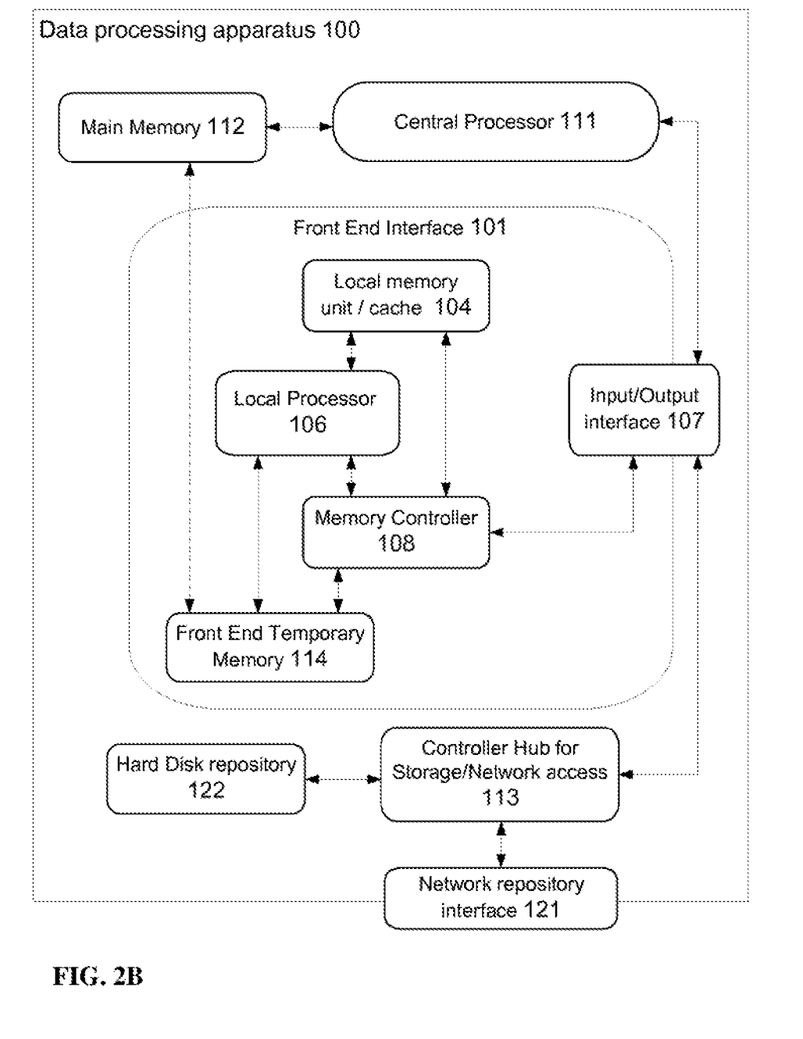
FIG. 2B is a schematic illustration of a data processing apparatus showing a front end interface with a single memory controller to perform data pre-processing, according to some embodiments of the disclosure.
Figure 2C:
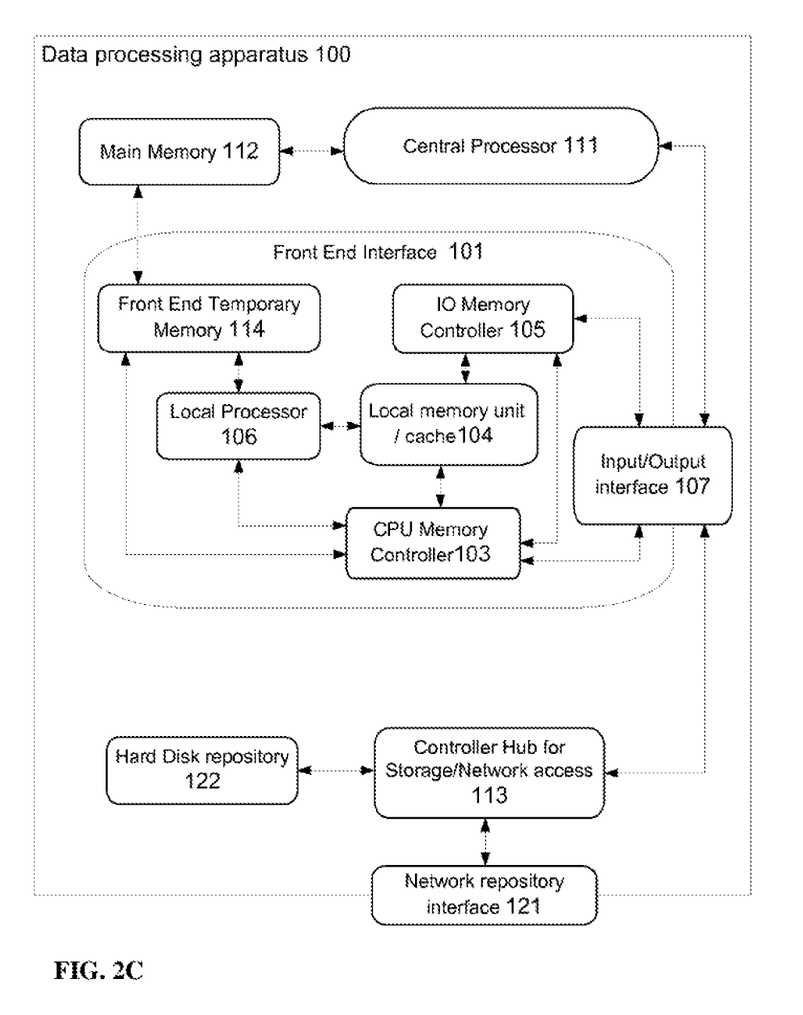
FIG. 2C is a schematic illustration of a data processing apparatus showing a front end interface with two memory controllers to perform data pre-processing, according to some embodiments of the disclosure.

Reference is now made to FIG. 2A, FIG. 2B, and FIG. 2C which are schematic illustrations of a data processing apparatus showing a front end interface to perform data pre-processing, according to some embodiments of the disclosure. The data processing apparatus 100 comprises a main central processor and/or central processing unit (CPU) 111 for analyzing data elements, and a controller hub 113 for receiving an incoming sequence and/or stream of data elements from a repository. The data elements are sent from a local repository 122, such as an internal and/or external hard disk, of a remote repository accessed through a network repository interface 121. According to some embodiments of the disclosure, the data processing apparatus 100 comprises a front end interface 101 adapted to receive a sequence and/or stream of data element requests from the CPU 111, and/or corresponding data elements from one or more repositories via the controller hub 113. The front end interface 101 determines, based on data access (such as the data elements received and/or data elements requested), when each data element belongs to a multiple access data or a single access data. The multiple access data elements are routed to the CPU 111 for storage in main memory 112 and the single access data elements are routed by the front end interface for pre-processing by one or more local processors 106. The single access data elements may be stored in the local memory unit 104 and/or front end temporary memory 114 before and/or after pre-processing. For example, the front end interface 101 determines when pre-processing results are sent to the CPU 111 for analysis and/or stored in front end temporary memory 114 for future use by the front end interface 101. When the CPU 111 has received all data elements needed for analysis into the main memory 112, the CPU 111 performs the analysis and stores the analysis results in the main computer memory 112. The front end interface 101 may receive the data analysis results coming from the CPU stage for additional pre-processing of incoming data elements. For example, a machine learning application uses previously analyzed results stored in the front end temporary memory 114 during the pre-processing of new incoming data elements.

Optionally, the front end interface uses a memory controller 108 to route the data elements, access the local memory unit 104, such as a cache memory, and access the front end temporary memory 114.

Optionally, the front end interface uses two or more memory controllers, such as an I/O memory controller 105 and a CPU memory controller 103 to route the data elements, access the local memory unit 104, such as a cache memory, and access the front end temporary memory 114. For example, the I/O memory controller 105 is adapted to route data elements received from the controller hub 113 and the CPU memory controller 105 is adapted to route the data elements to and/or from the CPU 111.

The I/O memory controller 105, CPU memory controller 103, and single memory controller 108 transfer data elements and/or requests for data elements via an input/output interface 107 of the front end interface 101. For example, the input/output interface 107 is a direct memory access interface, a direct media interface, a system bus interface, and the like. For example, the I/O memory controller 105, CPU memory controller 103, or single memory controller 108 can determine the data elements that are single access data elements or multiple access data elements.

The pre-processing by the front end interface 101 of single access data elements reduces the number of data element transfers to the main CPU memory 112 and thus reduces energy consumption of the data processing apparatus 100. For example, data elements that are sent to local memory unit 104 and/or the front end temporary memory 114 do not pass through the CPU 111 and/or main memory controller, to reduce the overall power consumption of the apparatus 100.

The front end temporary memory 114 connected to the front end interface 101 is different from the main CPU memory 112, but may be mapped into the same memory address space as the main memory 112. By mapping the front end temporary memory 114 storage addresses into the CPU main memory 112 address space, the analysis results data sets may be used for further processing by the CPU 111 and/or front end interface 101.

Figure 3:
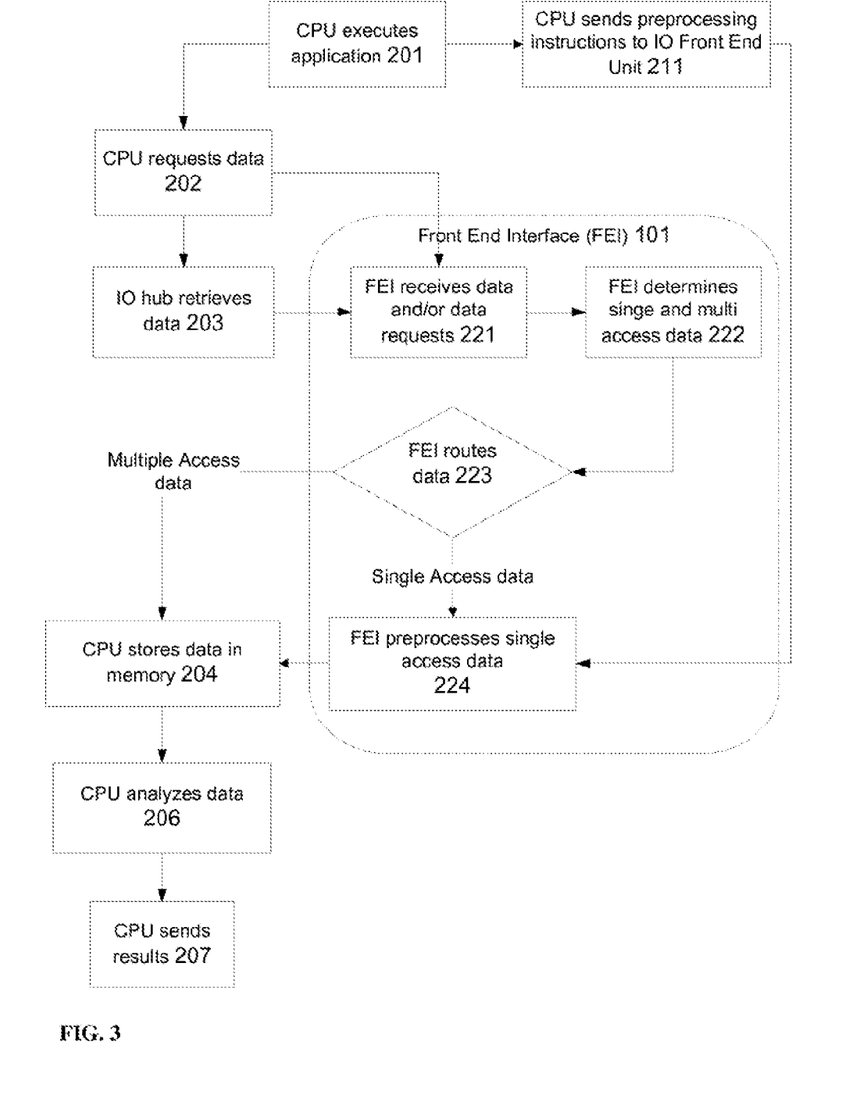
FIG. 3 is a flowchart of a method to perform data pre-processing on a front end interface, according to some embodiments of the disclosure.

Reference is now made to FIG. 3, which is a flowchart of a method to perform data pre-processing on a front end interface according to embodiments of the disclosure. A CPU 111 executes 201 a data processing application and requests 202 the data needed for analysis, such as a sequence of access requests for data elements. The CPU 111 may send 211 the pre-processing instructions to the front end interface 101. The data access requests are received by an I/O controller hub 113 that retrieves 203 the requested data from the repository, such as a hard disk 122 or network repository, using a network interface 121. The data access requests may be received 221 by the front end interface 101 for determining when each data element is a single access data element or a multiple access data element. The front end interface 101 calculates 222 an access parameter for each data element request and/or date element received to determine access type of the data element, such as a single access data element or a multiple access data element. By comparing 223 the access parameter value to a routing threshold value, the front end interface 101 determines when the requested data element is a single access element or a multiple access element. The controller hub 113 sends the requested data elements to the front end interface 101 that routes the data elements according to the determined data access type, such as single access data elements and multiple access data elements. The multiple access data elements are routed to the CPU 111 for storage 204 in main memory 112. The single access data elements are routed to the local memory unit 104 and/or the front end temporary memory 114 for pre-processing 224 by the front end interface 101. The local processors 106 of the front end interface 101 pre-processes 224 the single access data elements, such as filtering and aggregating the single access data elements, to produce the pre-processing results. The pre-processing results are stored 204 by the front end interface 101 in the front end temporary memory 114, in the local memory 104, and/or stored in the main memory 112. The CPU 111 analyzes 206 the data and sends 207 the results to a repository, such as using a network interface 121 and/or to a local hard disk 122, and/or to the front end temporary memory 114 for further pre-processing of new data elements.

When the access parameter value is an absolute time between accesses of the same data element, the front end interface 101 computes an estimated time between data element requests, measures the time between data elements received, and the like. For example, when each data element is received by the front end interface 101 for pre-processing a first time, a timer is initiated for each data element. For example, when a data element is received by the front end interface 101 for pre-processing a second time after 5 second, and the multiple access threshold value is 4 seconds, the data element is determined to be a single access data element. In this example, the second time the data element is received, the data element is sent by the front end interface 101 to the CPU 111 for pre-processing and/or analysis. For example, a sequence of data element requests are analyzed by the front end interface 101 to emulate the reception time of the data elements received. In this example, the front end interface 101 calculates that the second access of a data element is after 2 minutes, and when the multiple access threshold is 30 seconds, the front end interface 101 determines that the data element is a single access data element. In this example, both receptions of the single access data element are routed and pre-processed by the front end interface 101.

When the access parameter value is a relative time between accesses of the same data element, the sequence of data element requests and/or data element receptions may be analyzed by the front end interface 101 according to a counting of the total number of data elements between accesses to the same data element. For example, when a data element has been accessed only once in 10 million accesses and the threshold for single access is 5 million accesses, the data element is determined by the front end interface 101 to be a single access data element. In this example, for each data element a counter is initiated at the first access of a data element, and incremented and/or decremented, according to the counter type, for each subsequent data element that is accessed. Once the counter reaches the threshold, such as zero for a countdown counter, the data element is determined by the front end interface 101 to be single access. When the same data element is accessed a second time before the counter reaches the threshold, the data element is determined by the front end interface 101 to be a multiple access data element and routed to the CPU 111. As used herein, the term access means a request for the data element is in a sequence of requests or the data element is received in a sequence as in a stream by the front end interface 101.

When the access parameter value is a reuse distance between accesses of the same data element, the sequence of data element requests and/or data element receptions may be analyzed by the front end interface 101 according to a counting of the total number of different data elements between accesses to the same data element. Single access data elements may be data elements that have a reuse distance bigger than the size of the physical memory resources, such as the CPU main memory and/or CPU cache memory, thus minimizing memory page swaps and reducing power consumption. The reuse distance is defined as the number of unique input data elements accessed between two consecutive accesses of the same input data element, as described by Ding et al in "Reuse Distance Analysis" published in Technical Report UR-CS-TR-741, Computer Science Department, University of Rochester, Rochester, N.Y., February 2001.

For example, when a data element has been accessed only once in 4 million different data element accesses and the threshold for single access is 2 million accesses to unique data elements, the data element is determined by the front end interface 101 to be a single access data element. In this example, for each data element a counter is initiated at the first access of a data element, and incremented and/or decremented, according to the counter type, for each subsequent unique data element that is accessed. For example, a sequence of requests to access data elements is analyzed to calculate the reuse distance for each unique data element, and when the reuse distance of a particular data element is above a routing threshold value, the data element is determined to be a single access data element.

Optionally, the local memory unit 104 of the front end interface 101 is a cache memory that is accessed by the local processors 106 for read and/or write access. For example, the local memory unit is a fast static random-access memory (SRAM). The local memory unit 104 may be accessed by the CPU memory controller 103, I/O memory controller 105, and/or memory controller 108 using a DMA interface in order to store data into the front end temporary memory 114 and/or transfer data to the main CPU memory 112.

The front end interface 101 local processors 106 are one or more application specific processing cores that execute the filtering and aggregation of data elements before transfer to the CPU for analysis. For example, the local processors 106 are reduced instruction set computing (RISC) processors, such as an Acorn RISC Machine (ARM) processor, and are incorporated into an integrated circuit of a front end interface 101. For example, the local processors are complex instruction set computing (CISC) processors, such as an Intel® Atom™ processor, incorporated in a printed circuit board.

The processing core chosen to implement embodiments of the disclosure as the front end local processor influences the conversion of the pre-processing instructions from the main CPU 111 to the front end interface 101 local processors 106, optionally, using a software module. Optionally, the choice of a processing core is not limited to a specific type or brand of a processing core. Similarly, the make and model of the main apparatus 100 CPU 111 is not limited to a specific make and model of processor.

Optionally, in some embodiments of the disclosure, the front end interface 101 further comprises a software module that receives processor instructions to enable the operation and/or pre-processing of the front end interface 101. For example, a text file containing computer programming language code is compiled by a compiler, and the compiler comprises a software module library containing functions to enable the pre-processing to be performed on the front end interface 101. These functions may be porting functions to transfer the pre-processing processor instructions from the machine language of the main CPU 111 to the machine language of the local processors 106. For example, porting of pre-processing instructions is performed from a CISC instruction set to a RISC instruction set. For, example, during generation of a data processing application the pre-processing instructions are directly compiled by a compiler into a RISC processor instruction set used by a local processors 106. Optionally, a device driver installed in an operating system of the computer controls the pre-processing instructions and front end interface 101 operational instructions. For example, an operational instruction, such as the access parameter type, is modified through a device driver that changes the front end interface 101 operation. For example, the device driver has a user interface to select a dynamic routing threshold adjustment to lower the instantaneous power consumption. For example, the device driver has a user interface to select an access parameter type, such as an absolute time, a relative time, a reuse distance, a memory size, and the like.

Embodiments of a front end interface 101 used to pre-process single access data of a data processing application may be incorporated electronically and digitally into a data processing apparatus 100 in a variety of technical means. For example, the front end interface 101 is embodied as an I/O stage group of integrated circuits, such as a chipset, that is incorporated on a computer motherboard in addition to the existing CPU 111 and chipsets. For example, the front end interface 101 is incorporated into a chipset based on the Intel® model DH82Z97 PCH integrated circuit. For example, the front end interface is incorporated into a printed circuit board attached as an add-on card to an existing computer motherboard, and a device driver is used to transfer the data using the system bus. For example, the front end interface is incorporated into the motherboard as discrete components and specialized integrated circuits. For example, the front end interface is incorporated into a single integrated circuit that is added to a computer motherboard. For example, the front end interface is implemented as a system-on-chip (SOC) product.

Optionally, the front end interface 101 is incorporated electronically and digitally into integrated circuit and/or printed circuit board using industry standard computer interfaces and fabrication techniques. For example, the front end interface 101 is an add-on circuit board with a 16-lane Peripheral Component Interconnect Express (PCIe ×16) expansion bus interface.

Pre-processing the data at the I/O stage may reduce memory allocation resources for data analysis and may reduce CPU cache memory pollution, increasing the overall performance of the data processing apparatus. Furthermore, embodiments of the present disclosure scale well with the size of the data, and the energy savings increase with an increase in the input data size.

Figure 4:
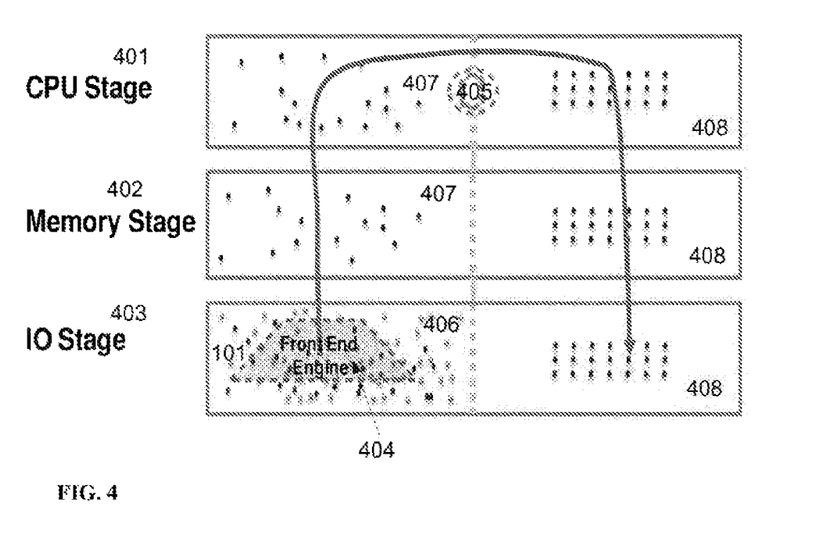
FIG. 4 is a schematic illustration of data flow stages in a data processing application incorporating a front end interface, according to some embodiments of the disclosure.

Following is a schematic illustration giving an example of the data reduction benefits for a data processing application. Reference is now made to FIG. 4, which is a schematic illustration of data flow stages in a data processing application incorporating a front end interface 101 according to some embodiments of the disclosure. The I/O stage 403 of the data processing incorporates a front end interface 101, such as a front end engine, that performs the pre-processing 404 as part of the data input stage 403 and reduces the large amounts of input data 406 to smaller amounts of input data 407 transferred to the memory stage 402. The memory stage 402 thus saves a considerable amount of energy used to transfer and store the large amounts of input data. The CPU stage 401 also saves a considerable amount of energy in transferring the smaller amounts of input data 407 to the processor for analysis 405. The data analysis results and/or output ordered results datasets 408 may be stored in memory during the memory stage 402, and/or sent to a repository and/or second computerized device in the I/O stage 403.

The flowchart and block diagrams in the Figures illustrate the architecture, functionality, and operation of possible implementations of systems, methods and devices according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant processing cores will be developed and the scope of the term local processing is intended to include all such new technologies a priori.

It is expected that during the life of a patent maturing from this application many relevant central processor and/or processing units will be developed and the scope of the term central processor and/or processing unit is intended to include all such new technologies a priori.

It is expected that during the life of a patent maturing from this application many relevant data processing applications will be developed and the scope of the term data processing application is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicated number and a second indicated number and "ranging/ranges from" a first indicated number "to" a second indicated number are used herein interchangeably and are meant to include the first and second indicated numbers and all the fractional and integral numerals therebetween.

An object of embodiments of the disclosure is to efficiently execute big data processing applications. An object is solved by the independent claims of this application, and the dependent claims protect further implementation forms.

According to some embodiments of the disclosure there is provided a data processing apparatus comprising a front-end interface electronically coupled to a main processor. The front-end interface is adapted to receive data stored in a repository, in particular an external storage and/or a network. The front-end interface is adapted to determine whether the data is a single-access data or a multiple-access data by analyzing an access parameter designating the data. The front-end interface is adapted to route the multiple-access data for processing by the main processor. The front-end interface is adapted to route the single-access data for pre-processing by the front-end interface and routing results of the pre-processing to the main processor.

Optionally, the access parameter is based on any from the group of a reception time between two receptions of the same data on the front-end interface, and a request time between two requests of the same data by the main processor.

Optionally, the access parameter is measured as a relative time between two receptions and/or two request of the same data on the front-end interface.

Optionally, the access parameter is measured as an absolute time of a second access of the same data on the front-end interface.

Optionally, the access parameter is measured by counting a number of different data between two accesses of the same data on the front-end interface.

Optionally, the single access data is determined by comparing the access parameter to a threshold value.

Optionally, the front-end interface comprises one or more local processor adapted to access a local memory unit, pre-process the single-access data and/or store the single-access data to the local memory unit, and route results of the pre-processing to the main processor for further processing.

Optionally, the pre-processing comprises a group of application specific instructions for filtering and aggregating two or more data elements of the single-access data.

Optionally, the one or more local processor of the front-end interface incorporates a pre-processing instruction transfer module, wherein the pre-processing instruction transfer module is configured to receive the group of application specific instructions from the main processor, convert the group of application specific instructions to a machine language of the one or more processor, and execute the machine language on the one or more processor to perform the pre-processing.

Optionally, the front-end interface comprises a temporary memory unit for storing at least some members of the results before routed to the main processor.

Optionally, the memory storage addressed in the temporary memory unit is mapped into storage addresses of a main memory of the main processor.

Optionally, the front-end interface is adapted to receive a main processor output from the main processor and to use the main processor output to pre-process the single-access data.

Optionally, a local processor instruction is generated by a device driver incorporated into an operating system configured to operate the main processor to perform the pre-processing.

According to some embodiments of the disclosure there is provided a method that comprises an action of receiving data stored in a repository, in particular an external storage and/or a network. The method comprises an action of determining whether the data is a single-access data or a multiple-access data by analyzing an access parameter designating the data. The method comprises an action of routing the multiple-access data for processing by a main processor. The method comprises an action of routing the single-access data for pre-processing by a front-end interface and routing results of the pre-processing to the main processor.

According to some embodiments of the disclosure there is provided a computer program product comprising a computer readable storage medium. The computer readable storage medium has encoded thereon first program instructions executable by a processor to receive data stored in a repository, in particular an external storage and/or a network. The computer readable storage medium has encoded thereon second program instructions executable by processor to determine whether the data is a single-access data or a multiple-access data by analyzing an access parameter designating the data. The computer readable storage medium has encoded thereon third program instructions executable by the processor to route the multiple-access data for processing by a main processor. The computer readable storage medium has encoded thereon fourth program instructions executable by the processor to route the single-access data for pre-processing by a front-end interface and routing results of the pre-processing to the main processor.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the disclosure may involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof using an operating system.

For example, hardware for performing selected tasks according to embodiments of the disclosure could be implemented as a chip or a circuit. As software, selected tasks according to embodiments of the disclosure could be implemented as a plurality of software instructions being executed by a computer using any suitable operating system. In an exemplary embodiment of the disclosure, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The invention claimed is:

1. A data processing apparatus, comprising:
a front-end interface electronically coupled to a main processor; the front-end interface is configured to:
receive input data from a data repository, wherein the data repository includes one of an external storage device and/or a network repository accessible using a network interface;
determine whether the input data is a single-access data or a multiple-access data by analyzing an access parameter designating the input data;
route the multiple-access data for processing by the main processor; and
route the single-access data for pre-processing by the front-end interface and routing results of the pre-processing to the main processor.

2. The data processing apparatus of claim 1, wherein the access parameter is based on a reception time between two receptions of a same data on the front-end interface, or a request time between two requests of a same data by the main processor.

3. The data processing apparatus of claim 2, wherein the access parameter is measured as a relative time between two receptions and/or two request of a same data on the front-end interface.

4. The data processing apparatus of claim 2, wherein the access parameter is measured as an absolute time of a second access of a same data on the front-end interface.

5. The data processing apparatus of claim 2, wherein the access parameter is measured by counting a number of data accesses between two accesses of a same data on the front-end interface.

6. The data processing apparatus of claim 2, wherein the single access data is determined by comparing the access parameter to a threshold value.

7. The data processing apparatus of claim 1, wherein the front-end interface comprises at least one local processor adapted to:
access a local memory unit;
pre-process the single-access data and/or store the single-access data to the local memory unit; and
route results of the pre-processing to the main processor for further processing.

8. The data processing apparatus of claim 1, wherein the pre-processing comprises a group of application specific instructions for filtering and aggregating a plurality of data elements of the single-access data.

9. The data processing apparatus of claim 8, wherein the at least one local processor of the front-end interface incorporates a pre-processing instruction transfer module, wherein the pre-processing instruction transfer module is configured to receive the group of application specific instructions from the main processor, convert the group of application specific instructions to a machine language of the at least one processor, and execute the machine language on the at least one processor to perform the pre-processing.

10. The data processing apparatus of claim 1, wherein the front-end interface comprises a temporary memory unit for storing at least some members of the results before routed to the main processor.

11. The data processing apparatus of claim 10, wherein memory storage addressed in the temporary memory unit is mapped into storage addresses of a main memory of the main processor.

12. The data processing apparatus of claim 1, wherein the front-end interface is adapted to receive a main processor output from the main processor and to use the main processor output to pre-process the single-access data.

13. The data processing apparatus of claim 1, wherein a local processor instruction is generated by a device driver incorporated into an operating system configured to operate the main processor to perform the pre-processing.

14. A method, comprising:
receiving input data stored in a repository, wherein the data repository includes one of an external storage device and/or a network repository accessible using a network interface;

determining whether the input data is a single-access data or a multiple-access data by
analyzing an access parameter designating the data;
routing the multiple-access data for processing by a main processor; and
routing the single-access data for pre-processing by a front-end interface and routing results of the pre-processing to the main processor.

15. A non-transitory computer readable media storing computer instructions, that when executed by one or more processors, cause the one or more processors to perform the steps of:
receive input data stored in a repository, wherein the data repository includes one of an external storage device and/or a network repository accessible using a network interface;
determine whether the input data is a single-access data or a multiple-access data by analyzing an access parameter designating the data;
route the multiple-access data for processing by a main processor; and
route the single-access data for pre-processing by a front-end interface and routing results of the pre-processing to the main processor.

* * * * *